Patented Dec. 4, 1945

2,390,152

UNITED STATES PATENT OFFICE 2,390,152

SUBSTANTIVE AZO DYESTUFFS

Ernst Keller, Basel, Switzerland, assignor to J. R. Geigy A. G., Basel, Switzerland, a Swiss firm No Drawing. Application July 31, 1942, Serial No. 453,097. In Switzerland September 19, 1941

4 Claims. (Cl. 260—153)

It is known to prepare light-fast, copper-containing substantive disazo dyestuffs by coupling 1 mol. each of diazotised 2-amino benzoic acid and a diazotised o-aminophenol, for example 1-hydroxy-2-aminobenzene-4-sulfonic acid with 1 mol. of 5:5'-dihydroxy-2:2'-dinaphthyl-urea-7:7'-disulfonic acid, or by combining the dyestuffs from 1 mol. of diazotised 2-amino benzoic acid and a diazotised o-aminophenol, for example 1-hydroxy-2-aminobenzene-4-sulfonic acid and 1 mol. each of J-acid with phosgene to the corresponding urea, and converting the disazo dyestuffs thus obtained into the copper compound.

It has now been found that new valuable dyestuffs are obtained when 1 mol. each of a diazotised aminobenzene derivative with an o-positioned carboxyl group, and of diazotised 6-chloro-2-amino-1-hydroxybenzene sulfonic acid are caused to react with the condensation product from 2 mol. of 2-amino-5-hydroxynaphthalene-7-sulfonic acid with 1 mol. of phosgene or 1 mol. of cyanuric halide, whilst in the latter case the third halogen atom, capable of reaction, may be replaced by an organic or inorganic radical, which latter does not take any active part in the dyestuff formation, such for example as —NH₂ or —NH.C₆H₅ and the like and when the dyestuffs are coppered in the usual manner. Instead of the 2-aminobenzoic acid also its substitution products, such as 5-chloro-2-amino-benzoic acid, 5-nitro-2-amino benzoic acid and so on may be used.

The new dyestuffs are characterised in comparison with the known dyestuff, in general by an improved drawing property, improved water and washing fastness and partly by a still better light-fastness.

The present invention is illustrated by the following examples, without being limited thereto.

The parts are by weight unless otherwise stated.

Example 1

223.5 parts of 6-chloro-2-amino-1-hydroxybenzene-4-sulfonic acid are diazotised in the usual way and added to a solution of 504 parts of 5:5'-dihydroxy-2:2'-dinaphthylurea-7:7'-disulfonic acid in 5000 parts by volume of water and 200 parts of anhydrous sodium carbonate. After several hours the coupling is finished; there are now still added further 220 parts of anhydrous sodium carbonate and at 5–8° C. 137 parts of diazotised 2-aminobenzoic acid. When the dyestuff formation has finished, precipitation is effected with sodium chloride and the dyestuff is filtered off.

The moist filter cake is now dissolved in 20,000 parts by volume of water at 80° C., treated with 280 parts of crystalline sodium acetate and 500 parts of crystalline copper sulfate in the form of a 20% solution are allowed to flow in at 80–85° C. The whole is stirred for about 2 hours at 80–85° C. and the copper compound of the dyestuff is then precipitated with sodium chloride.

The dried copper-containing dyestuff constitutes a blackish violet powder, which dissolves in water with a bluish-red colour and dyes cellulose fibres in very light-fast Bordeaux shades.

It will be understood that in the above example the coppering may be effected, even without previous isolation of the dyestuff, i. e. directly after the coupling.

Example 2

137 parts of 2-aminobenzoic acid are diazotised in the usual manner and added to a solution of 589.5 parts of the secondary condensation product from 2 mol. of 2-amino-5-hydroxynaphthalene-7-sulfonic acid and 1 mol. of cyanuric chloride in 7000 parts by volume of water and 200 parts of anhydrous sodium carbonate. After the coupling has completed the dyestuff is precipitated with sodium chloride, filtered and again suspended with 10,000 parts by volume of water and 200 parts of anhydrous sodium carbonate. At 5° C., 223.5 parts of diazotised 6-chloro-2-amino-1-hydroxybenzene-4-sulfonic acid are allowed to flow in, and after the coupling is finished the disazo dyestuff is precipitated with sodium chloride and filtered off.

The moist filter cake is dissolved in 20,000 parts by volume of water at 80° C. and treated with a solution of 500 parts of crystalline copper sulfate in 2000 parts by volume of water and 1000 parts of 25% of ammonia. The whole is stirred for 3–4 hours at 80°–90° C., precipitated with sodium chloride and filtered.

The dyestuff constitutes a blackish violet powder, which dissolves in water with a red color and dyes cellulose fibres in very lightfast bluish red shades.

The coppering may also be effected by the process described in Example 1; furthermore isolation of the mono- and of the disazo dyestuff is not absolutely necessary, but has the advantage of producing somewhat purer products.

A similar dyestuff is obtained when in the above example instead of 589.5 parts of the secondary condensation product from 2 mol. of 2-amino-5-hydroxy-naphthalene-7-sulfonic acid and 1 mol. of cyanuric chloride, 646 parts of the tertiary condensation product from 2 mol. of 2-amino-5- hydroxynaphthalene-7-sulfonic acid, 1 mol. of aniline (a toluidine or xylidine or a substitution product of these amines) and 1 mol. of cyanuric chloride are used, a further similar dyestuff is obtained with 569 parts of the tertiary condensation product from 2 mol. of 2-amino-5-hydroxynaphthalene-7-sulfonic acid, 1 mol. of ammonia and 1 mol. of cyanuric chloride.

*Example 3*

182 parts of 5-nitro-2-aminobenzoic acid are diazotised in the usual way and allowed to flow into a neutral solution of 504 parts of 5:5'-dihydroxy-2:2'-dinaphthyl urea-7:7'-disulfonic acid in 5000 parts by volume of water and 250 parts of crystalline sodium acetate at 5° C. After completion of the coupling neutralisation is effected with a 10% sodium carbonate solution, then 220 parts of calcined sodium carbonate are added, the whole is again cooled to 5° C. and a solution of 223.5 parts of diazotised 6-chloro-2-amino-1-hydroxybenzene-4-sulfonic acid are allowed to flow in. After the coupling is finished, the copper compound is produced as described in Examples 1 and 2.

The dried dyestuff constitutes a violet-black powder, it dissolves in water with a blue-red color and dyes cellulose fibres in very lightfast Bordeaux shades.

Instead of the 5-nitro-2-aminobenzoic acid there may also be used the 2-aminobenzoic acid or the 5-chloro-2-aminobenzoic acid; the dyestuffs thus obtained possess very similar properties.

What I claim is:

1. The substantive azo dyestuffs having in the free state the following formula

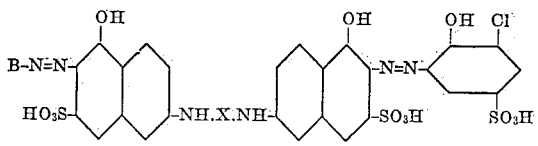

wherein B means an o-carboxyphenyl radical and X means a member of the linking groups selected from the class consisting of the —CO— and the divalent cyanuric radical, being when coppered dark powders dissolving in water with red color and dyeing cellulosic fibres in bluish red shades of improved water- and washing-fastness and in some cases also of improved light-fastness.

2. The substantive azo dyestuff having in the free state the following formula

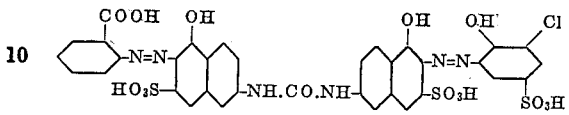

being when coppered a blackish-violet powder dissolving in water with a bluish-red color and dyeing cellulosic fibres in very light-fast Bordeaux shades.

3. The substantive azo dyestuff having in the free state the following formula

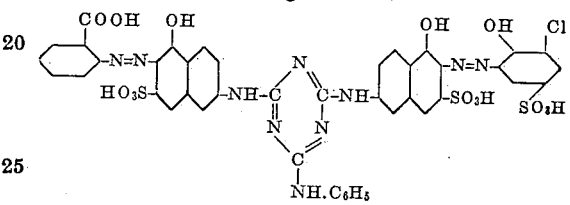

being when coppered a blackish violet powder dissolving in water with a bluish-red color and dyeing cellulosic fibres in very light-fast bluish-red shades.

4. The substantive azo dyestuff having in the free state the following formula

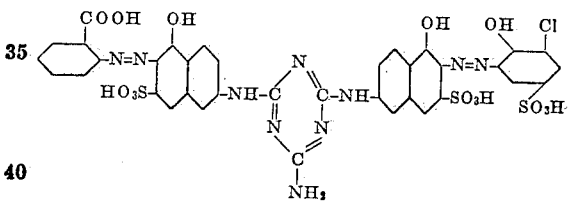

being when coppered a blackish violet powder dissolving in water with a bluish-red color and dyeing cellulosic fibres in very light-fast bluish-red shades.

ERNST KELLER.